United States Patent
Cho et al.

(10) Patent No.: US 9,423,988 B2
(45) Date of Patent: Aug. 23, 2016

(54) PRINT CONTROL APPARATUS, PRINT CONTROL METHOD, IMAGE FORMING APPARATUS, IMAGE FORMING METHOD AND COMPUTER-READABLE RECORDING MEDIUM

(71) Applicant: SAMSUNG ELECTRONICS CO., LTD., Suwon-si, Gyeonggi-do (KR)

(72) Inventors: Min-ki Cho, Yongin-si (KR); Jung-ho Bang, Yongin-si (KR); Kyeong-man Kim, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/595,592

(22) Filed: Jan. 13, 2015

(65) Prior Publication Data

US 2016/0041796 A1 Feb. 11, 2016

(30) Foreign Application Priority Data

Aug. 5, 2014 (KR) .......................... 10-2014-0100673

(51) Int. Cl.
*G06F 3/12* (2006.01)

(52) U.S. Cl.
CPC ........... *G06F 3/1219* (2013.01); *G06F 3/1229* (2013.01)

(58) Field of Classification Search
None
See application file for complete search history.

(56) References Cited

U.S. PATENT DOCUMENTS

| | | | | |
|---|---|---|---|---|
| 6,236,817 B1 * | 5/2001 | Kim | .................. | G03G 15/0121 358/515 |
| 6,313,925 B1 * | 11/2001 | Decker | ................ | H04N 1/6025 347/115 |
| 6,816,179 B2 * | 11/2004 | Hanyu | ................. | H04N 1/6058 347/115 |
| 6,944,331 B2 * | 9/2005 | Schmidt | .................. | G06T 7/001 382/165 |
| 8,917,412 B2 * | 12/2014 | Kakegawa | ............ | G06F 3/1219 358/1.15 |
| 8,970,878 B2 * | 3/2015 | Kakegawa | ............ | G06F 3/1208 358/1.15 |
| 9,131,087 B2 * | 9/2015 | Hattori | .................. | G06F 3/1219 |
| 9,230,206 B2 * | 1/2016 | Kawasaki | ............ | G06K 15/407 |
| 2002/0003634 A1 * | 1/2002 | Kohno | .................. | G06F 3/1204 358/1.13 |
| 2002/0071689 A1 * | 6/2002 | Miyamoto | ............ | G06F 3/1219 399/53 |
| 2003/0047099 A1 * | 3/2003 | Hanyu | ................. | H04N 1/6058 101/484 |
| 2004/0107855 A1 * | 6/2004 | Kizaki | .................. | G06F 3/1211 101/484 |
| 2007/0002349 A1 * | 1/2007 | Hwang | ................. | G06F 3/1204 358/1.13 |
| 2007/0153308 A1 * | 7/2007 | Zemach | .................... | H04N 1/60 358/1.9 |
| 2008/0144975 A1 * | 6/2008 | Shibaki | ................ | H04N 1/4072 382/299 |
| 2010/0053673 A1 * | 3/2010 | Oba | ........................ | G03G 21/02 358/1.15 |

(Continued)

*Primary Examiner* — Ted Barnes
(74) *Attorney, Agent, or Firm* — Staas & Halsey LLP (57) ABSTRACT

A print control apparatus connectable to an image forming apparatus, an image forming apparatus, a print control method, an image forming method, and a non-transitory computer-readable medium are provided. The print control apparatus includes a manipulation inputter configured to receive a command to print a document, a controller configured to calculate a toner amount for each of a plurality of print saving modes applicable to the document, and determine a print saving mode to be applied to the document based on the calculated toner amount, a printer driver configured to generate print data on the document according to the determined print saving mode, and a communication interface configured to transmit the generated print data to the image forming apparatus.

18 Claims, 7 Drawing Sheets

(56) References Cited

U.S. PATENT DOCUMENTS

| | | | | |
|---|---|---|---|---|
| 2010/0149562 A1* | 6/2010 | Park | H04N 1/0035 | 358/1.9 |
| 2010/0290066 A1* | 11/2010 | Son | H04N 1/6011 | 358/1.9 |
| 2011/0007359 A1* | 1/2011 | Yamakawa | G03G 15/502 | 358/1.15 |
| 2011/0055693 A1* | 3/2011 | Yoshimoto | G06F 3/1219 | 715/274 |
| 2011/0069325 A1* | 3/2011 | Kawashima | G06F 3/1219 | 358/1.1 |
| 2011/0279858 A1* | 11/2011 | Kano | G06F 3/1218 | 358/1.15 |
| 2011/0299100 A1* | 12/2011 | Chung | H04N 1/6055 | 358/1.9 |
| 2012/0188601 A1* | 7/2012 | Kutsuwada | G06F 3/1203 | 358/1.15 |
| 2012/0320410 A1* | 12/2012 | Kakegawa | G06F 3/1219 | 358/1.15 |
| 2013/0038908 A1* | 2/2013 | Nagai | H04N 1/605 | 358/3.23 |
| 2013/0108296 A1* | 5/2013 | Iinuma | G06F 3/1229 | 399/53 |
| 2013/0194595 A1* | 8/2013 | Murata | G06K 15/4065 | 358/1.9 |
| 2013/0235392 A1* | 9/2013 | Iinuma | G06K 15/005 | 358/1.2 |
| 2014/0078534 A1* | 3/2014 | Oda | G06F 3/1219 | 358/1.13 |
| 2015/0169270 A1* | 6/2015 | Watanabe | G06K 15/1823 | 358/1.13 |

* cited by examiner

PRINT CONTROL APPARATUS, PRINT CONTROL METHOD, IMAGE FORMING APPARATUS, IMAGE FORMING METHOD AND COMPUTER-READABLE RECORDING MEDIUM

CROSS-REFERENCE TO RELATED APPLICATIONS

This application is related to, and claims priority benefit of, Korean Patent Application No. 10-2014-0100673 filed on Aug. 5, 2014 in the Korean Intellectual Property Office, the disclosure of which is incorporated herein by reference in its entirety.

BACKGROUND

1. Field

Aspects of the exemplary embodiments relate to a print control apparatus, a print control method, an image forming apparatus, an image forming method, and a computer-readable recordable medium, more particularly to a print control apparatus, a print control method, an image forming apparatus, an image forming method, and a computer-readable recordable medium that may print a document using at least one print saving mode from among a plurality of print saving modes.

2. Description of the Related Art

An image forming apparatus is an apparatus that generates, prints, receives, and transmits image data, and a representative example includes a printer, a scanner, a copy machine, a fax, and a multi-function peripheral (MFP).

The image forming apparatuses require ink, toner, paper, or energy to print an image on paper. Various methods have been tried in an attempt to save ink, toner, paper, and energy.

For an image forming apparatus used for a business, an issue of wasted ink, toner, paper, and energy is serious. To attempt to overcome this issue, for example, a print condition to convert color to black or white may be stored or a print condition to print on both sides of paper may be designated.

However, a user needing to change the print settings may be inconvenient.

Therefore, a way to save toner while printing that is convenient to a user convenience is desired.

SUMMARY

Additional aspects and/or advantages will be set forth in part in the description which follows and, in part, will be apparent from the description, or may be learned by practice of the embodiments.

An aspect of an exemplary embodiment provides a print control apparatus, a print control method, an image forming apparatus, an image forming method, and a non-transitory computer-readable recordable medium that may print a document using at least one print saving mode from among a plurality of print saving modes.

According to an aspect of an exemplary embodiment, a print control apparatus connectable to an image forming apparatus includes a manipulation inputter configured to receive a command to print a document, a controller configured to calculate a toner amount for each of a plurality of print saving modes applicable to the document, and determine a print saving mode to be applied to the document based on the calculated toner amount, a printer driver configured to generate print data on the document according to the determined print saving mode, and a communication interface configured to transmit the generated print data to the image forming apparatus.

The controller may compare a calculated toner amount for each of the plurality of print saving mode with a preset toner amount, and determine a print saving mode in which a difference between the preset toner amount and the calculated toner amount is at a minimum amount as a print saving mode to be applied for the document.

The plurality of print saving modes may include a first print saving mode in which toner saving levels are differently set for objects included in the document.

The plurality of print saving modes may include a second print saving mode in which toner saving is not set for texts in the document, but toner saving is set for images or graphics in the documents.

The plurality of print saving modes may include a third print saving mode in which only boundary of images or graphics is printed.

The manipulation inputter may receive selection of a page to which the print saving mode is applied, and wherein the controller may calculate the toner amount by applying each of the plurality of print saving modes to the selected page through the manipulation inputter.

The print control apparatus may include a display that displays a plurality of preview images to which each of a plurality of print saving modes is applied and calculated toner amount, wherein the controller may determine a print saving mode that corresponds to the selected preview image as a print saving mode, when one of the plurality of preview images is selected.

The controller may control the display to display a preview image to which a print saving mode where the calculated toner amount from among the plurality of print saving modes is not more than a preset toner amount is applied.

According to an exemplary embodiment, a print control apparatus connectable to an image forming apparatus includes a manipulation inputter configured to receive a command to print a document, a controller configured to calculate a toner amount for each of a plurality of print saving mode applicable to the document, and determine a print saving mode to be applied to the document based on the calculated toner amount, a printer driver configured to generate print data on the document, and a communication interface configured to transmit the generated print data and information on the determined print saving mode to the image forming apparatus.

According to an exemplary embodiment, an image forming apparatus includes a communication interface configured to receive print data, a controller to calculate a toner amount for each of a plurality of print saving modes applicable to the print data, and determine a print saving mode to be applied to the print data based on the calculated toner amount, and an image forming unit to print the received print data using the determined print saving mode.

According to an exemplary embodiment, a print control method includes receiving a command to print a document, calculating a toner amount for each of a plurality of print saving modes applicable to the document and determining a print saving mode to be applied to the document based on the calculated toner amount, generating print data on the document according to the determined print saving mode, and transmitting the generated print data to an image forming apparatus.

The determining includes comparing a calculated toner amount for each of the plurality of printing saving mode with a preset toner amount, and determining a print saving mode in which a difference between the preset toner amount and the calculated toner amount is at a minimum amount as a print saving mode to be applied for the document.

The plurality of print saving modes include a first saving mode in which toner saving levels are differently set for objects included in the document.

The plurality of print saving modes may include a second print saving mode in which toner saving is not set for texts in the document, but toner saving is set for images or graphics in the documents.

The plurality of print saving modes may include a third print saving mode in which only boundary of images or graphics is printed.

The print control method may include receiving selection of a page to which the print saving mode is applied, wherein the determining may include calculating a toner amount by applying each of the plurality of print saving modes to the selected page, and determining a print saving mode to be applied to the document based on a calculated toner amount.

The print control method may include displaying a plurality of preview images to which each of the plurality of print saving modes is applied and a calculated toner amount, wherein the determining may include a print saving mode that corresponds to the selected preview image as a print saving mode, when one of the plurality of preview images is selected.

According to an exemplary embodiment, a print control method includes receiving a command to print a document, calculating a toner amount for each of a plurality of print saving mode applicable to the document and determining a print saving mode to be applied to the document based on the calculated toner amount, generating print data on the document, and transmitting the generated print data and information on the determined print saving mode to an image forming apparatus.

According to an exemplary embodiment, an image forming method includes receiving print data, calculating a toner amount for each of a plurality of print saving modes applicable to the document and determining a print saving mode to be applied to the document based on the calculated toner amount, and printing the received print data using the determined print saving mode.

According to an exemplary embodiment, a non-transitory computer-readable medium including a program to execute a print control method includes receiving a command to print a document, calculating a toner amount for each of a plurality of print saving modes applicable to the document and determining a print saving mode to be applied to the document based on the calculated toner amount, generating print data on the document according to the determined print saving mode, and transmitting the generated print data to an image forming apparatus.

According to the exemplary embodiments, print may be performed by using a print saving mode that is optimized to a document to be printed from among a plurality of print saving modes.

BRIEF DESCRIPTION OF THE DRAWINGS

The above and/or other aspects will be more apparent and more readily appreciated from the following description of the embodiments with reference to the accompanying drawings, in which.

DETAILED DESCRIPTION

Reference will now be made in detail to the embodiments, examples of which are illustrated in the accompanying drawings, wherein like reference numerals refer to the like elements throughout. The embodiments are described below to explain the embodiments by referring to the figures.

In the following description, like drawing reference numerals are used for the like elements, even in different drawings. The matters defined in the description, such as detailed construction and elements, are provided to assist in a comprehensive understanding of exemplary embodiments. However, exemplary embodiments may be practiced without those specifically defined matters.

Figure 1:
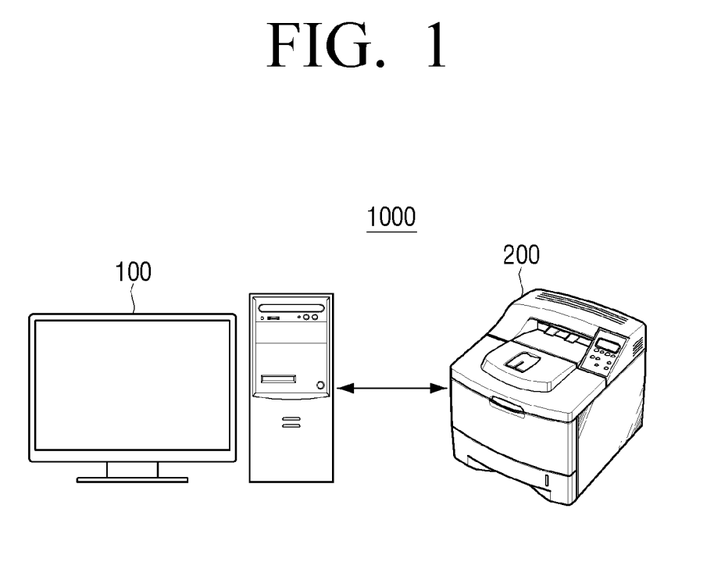
FIG. 1 is a view illustrating a configuration of an image forming system according to an exemplary embodiment.

FIG. 1 is a view illustrating a configuration of an image forming system according to an exemplary embodiment. Referring to FIG. 1, an image forming system 1000 includes a print control apparatus 100 and an image forming apparatus 200.

The print control apparatus 100 may generate print data with respect to a document and transmit the generated print data to the image forming apparatus 200. The print control apparatus 100 may be a PC, notebook, mobile phone, smartphone, a portable multimedia player (PMP), MPEG audio layer-3 (MP3) that may generate print data.

The image forming apparatus 200 may print data. The image forming apparatus 200 may perform printing with respect to received print data from the print control apparatus 100, scanned image, or prestored document file. The image forming apparatus 200 may be a multi-function peripheral (MFP) that realizes a printer, a copy machine, a facsimile, or functions of the foregoing through one apparatus.

The image forming system 1000 according to an exemplary embodiment, to print a document using at least one apparatus including the print control apparatus 100 or the image forming apparatus 200, may generate print data by applying a print saving mode so that toner amount is saved.

The print control apparatus 100 may generate print data by applying at least one print saving mode from among a plurality of print saving modes in a process of generating print data, and transmit the generated print data to the image forming apparatus 200. Generation of print data to which print saving mode is applied may be performed by the print control apparatus 100, and therefore, the print control apparatus 100 may be connected to the image forming apparatus according to an exemplary embodiment, and to a related-art the image forming apparatus. The detailed configuration and operations of the print control apparatus 100 according to an exemplary embodiment is described with reference to FIG. 2.

The print control apparatus 100 may generate general print data, that is, print data to which a print saving mode is not applied, transmit the data to the image forming apparatus 200, and the image forming apparatus 200 may apply a print saving mode to the received print data, and print data to which print saving mode is applied. Generation of print data to which a print saving mode is applied may be performed by the image forming apparatus 200, and thus, the image forming apparatus 200 may be connected to not only a print control apparatus according to an exemplary embodiment but also a related-art print control apparatus. A print saving mode may be applied to prestored data or a scanned image of the image forming apparatus 200, and therefore, it is not necessary that the print control apparatus 100 and the image forming apparatus 200 are not connected to each other. An exemplary image forming apparatus 200 is described with reference to FIG. 4.

The print control apparatus 100 may print a print data to which a print saving mode is applied, by transmitting to the image forming apparatus 200 information on a print saving mode to be applied to general print data (that is, print data to which print saving mode is not applied) and a print saving mode to be applied to print data, and applying by the image forming apparatus 200 a print saving mode to print data received by using information on the received print saving. Determination of a print saving mode to be applied to print data may be performed by the print control apparatus 100, and generation of print data to which a print saving mode is applied may be performed by the image forming apparatus 200. The print control apparatus 100 and the image forming apparatus 200 according to an exemplary embodiment may be similar to a print control apparatus and an image forming apparatus described with reference to FIGS. 2 and 4.

The image forming system 1000 according to an exemplary embodiment generates print data by applying a print saving mode by the print control apparatus 100 or the image forming apparatus 200, and a user may save toner amount. This print saving mode may be automatically applied based on preset criteria, and thus, a user may save toner without a separate manipulation.

As illustrated in FIG. 1, the print control apparatus 100 may be connected to one image forming apparatus 200, or the print control apparatus 100 may be connected to a plurality of image forming apparatuses 200. The image forming apparatus 200 may be also connected to a plurality of print control apparatuses 100.

As illustrated in FIG. 1, the print control apparatus 100 is directly connected to the image forming apparatus 200. However, the print control apparatus 100 and the image forming apparatus 200 may be indirectly connected through a router or the like, and be connected with/without wire.

Figure 2:
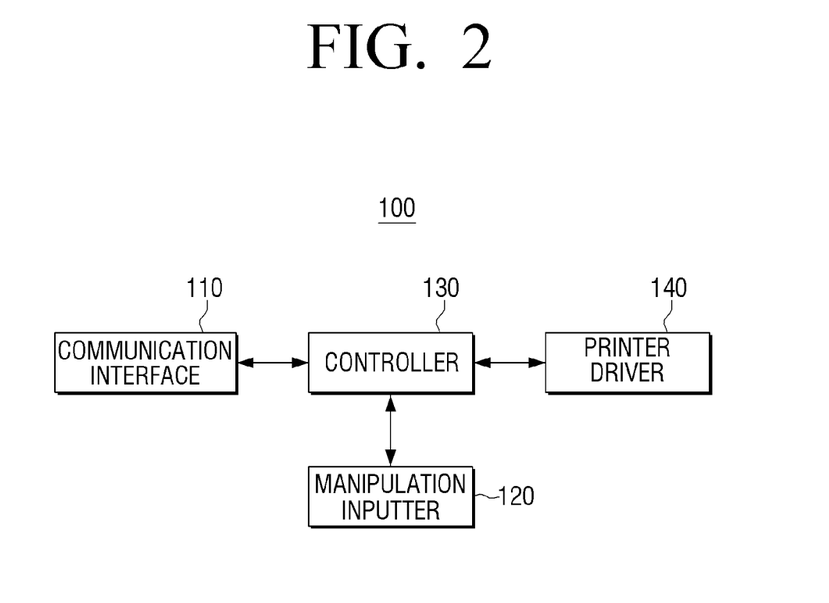
FIG. 2 is a block diagram illustrating a configuration of a print control apparatus according to an exemplary embodiment.

FIG. 2 is a block diagram illustrating a configuration of a print control apparatus 100 according to an exemplary embodiment.

Referring to FIG. 2, the print control apparatus 100 according to an exemplary embodiment includes a communication interface 110, a manipulation inputter 120, a controller 130, and a printer driver 140. The print control apparatus 100 may be an apparatus that may generate print data such as a personal computer, notebook, a personal digital assistant (PDA), a portable multimedia player (PMP), and a mobile phone.

The communication interface 110 may be formed to connect the print control apparatus 100 with an external apparatus, specifically, the image forming apparatus 200, may be connected to the image forming apparatus 200 through a local area network (LAN) and internet network, and may be connected using a universal serial bus (USB) port and a wireless communication method.

The communication interface 110 receives status information from the image forming apparatus 200. The status information may include information on whether the image forming apparatus 200 is operable and toner information (to be specific, information on amount of toner (when the image forming apparatus has a plurality of toners, information on toner amount of each toner)). The status information may include information on toner price.

The communication interface 110 transmits print data to the image forming apparatus 200. The communication interface 110 may transmit to the image forming apparatus 200 the print data that is generated by the printer driver 140. According to an exemplary embodiment, the printer driver 140 generates print data and transmits to the image forming apparatus 200. If the image forming apparatus 200 is an apparatus that supports direct printing, the communication interface 110 may transmit an image file to which printing saving mode is applied to the image forming apparatus 200. The communication interface 110 may individually transmit print data and information on print saving mode to the image forming apparatus 200, and apply the print saving mode to the received print data using information on print saving mode received from the image forming apparatus 200.

The manipulation inputter 120 has a plurality of function keys of which various functions supportable by the print control apparatus 100 may be set or selected by a user. The manipulation inputter 120 may be implemented as apparatuses such as a mouse and a keyboard, and/ or, an apparatus such as a touch screen that implements input and/or output. When the embodiment is realized as a touch screen, various information provided by the print control apparatus 100 may be displayed.

The manipulation inputter 120 receives a command to print a document. A user may select a print job (or a print file) to print by using the manipulation inputter 120.

According to an exemplary embodiment, a print saving mode to be applied to a document may be automatically determined by the controller 130, for example, according to preset criterion. According to an exemplary embodiment, at least one of a print saving mode may be selected from among a plurality of print saving modes that a user may directly apply to a document through the manipulation inputter 120.

The manipulation inputter 120 may receive selection of a page to which a print saving mode is applied, and may receive different print saving modes by pages. For example, through the manipulation inputter 120, a user may select a first print saving mode so that a boundary of an image is printed and texts are output with 100% concentration as to a first page of a document, and select a second print saving mode so that a color image is printed in black & white image as to a second page.

Based on user selection, and/or according to an automatically applied print saving mode based on a preset criterion, the controller 130 may calculate toner amount that is to be used for printing a document. Toner amount may be indicated as toner saving percent, toner saving level, or toner concentration.

The controller 130 controls each configuration in the print control apparatus 100. The controller 130 may calculate toner amount of each of a plurality of print saving modes applicable to a document.

Which print saving mode is to be applied for a document from among print saving modes may be determined from among object attributes included in a document to be printed. For example, when a graphic or an image object is included in a document, a print saving mode that is set so that only a boundary of an image or a graphic is printed is applicable. According to an exemplary embodiment, when objects of graphics or images and texts are included in a document, a print saving mode may be applicable in which a concentration of objects of graphics or images may be reduced, but an original concentration may be maintained for texts.

That is, the controller 130 may analyze object attributes included in a document, and calculate toner amount by applying print saving modes applicable from among a plurality of print saving modes.

The plurality of print saving modes may include the following examples: when a concentration of an image in an original document is 100%, a mode that is set to reduce concentration of an image in a document to a preset percent, a mode in which toner saving levels are differently set by objects included in a document, a mode in which toner saving is not set for texts in a document but toner saving is set for images or graphics in a document, a mode that is set so that boundary of images or graphics in a document is printed, a mode in which color objects in a document are printed in black and white, a mode in which both sides of a document are printed, a mode in which all documents are printed, and a mode in which all the texts are printed in black, or the like. The above are merely an example of a print saving mode, and other modes that may save toner may be available.

The controller 130 may combine a plurality of print saving modes and calculate toner amount. For example, the controller 130 may apply the first print saving mode, the second print saving mode, and the third print saving mode in an overlapped manner and calculate toner amount.

When a page to apply a print saving mode is selected through the manipulation inputter 120, the controller 130 may apply each of a plurality of print saving modes for a selected page and calculate toner amount.

For example, if a user wants to apply a print saving mode only for pages including images or graphics that require relatively larger toner consumption, and does not want to apply a print saving mode for pages including texts, a user may select application of a print saving mode differently for respective pages of a document through the manipulation inputter 120. Accordingly, the controller 130 may apply each of a plurality of print saving modes only for pages to which a print saving mode is applied and calculate each toner amount to print entire document.

The controller 130 may reduce a document to ¼ and ⅟₁₆ and calculate toner amount. In reducing a document and calculating toner amount, calculation speed may be increased.

The controller 130 may determine a print saving mode to be applied to a document based on calculated toner amount. For example, the controller 130 may determine a print saving mode in which calculated toner amount is least, as a print saving mode to be applied to a document.

The controller 130, by comparing toner amount calculated for each of a plurality of print saving modes with a preset toner amount, may determine a print saving mode in which difference between a preset toner amount and calculated toner amount is least as a print saving mode to be applied to a document. The preset toner amount may be adjusted by a user.

For example, when a preset toner amount is 50, if toner amount for the first print saving mode is 40, toner amount for the second print saving mode is 45, and toner amount for the third print saving mode is 52, the controller 130 may determine the third print saving mode in which a difference between the preset toner amount and the calculated toner amount is least as a print saving mode to be applied to a document.

According to an exemplary embodiment, the controller 130 may determine a print saving mode in which a difference between a preset toner amount and a calculated amount is least but at the same time the difference is less than a preset toner amount as a print saving mode to be applied for a document. According to an exemplary embodiment, the controller 130 may determine the second print saving mode of which toner amount is 45 as a print saving mode to be applied for a document.

Whether to automatically determine a print saving mode based on the calculated toner amount may be selected when receiving a print command. This will be explained with reference to FIG. 3.

Figure 3:
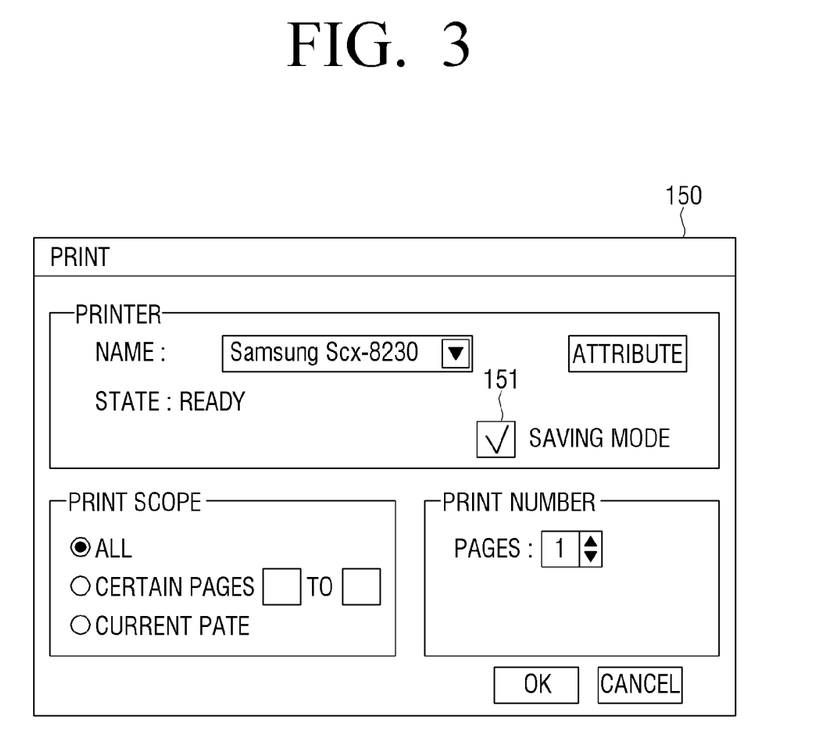
FIGS. 3-4 illustrate a screen that is displayed on a display of a print control apparatus according an exemplary embodiments.

FIG. 3 illustrates a screen that is displayed on the display 150 of the print control apparatus 100 according to an exemplary embodiment. The display 150 may be a monitor may be a touch screen along with the manipulation inputter 120.

Referring to FIG. 3, the display 150 may display an interface screen to receive a print command. A user, based on the contents displayed on an interface screen, may select whether or not to apply a print saving mode through the manipulation inputter 120. For example, the display 150 may display a saving print check box 151 along with other print options. When the saving print check box 151 may be selected, and OK button is selected, the controller 130 may calculate toner amount by applying each of a plurality of print saving modes to a document based on a print command, and determine a print saving mode to be applied to a document based on the calculated toner amount.

A print saving mode to be applied to a document may be automatically determined, but it may be determined by a user manipulation along with the calculated toner amount as described with reference to FIG. 4.

Figure 4:
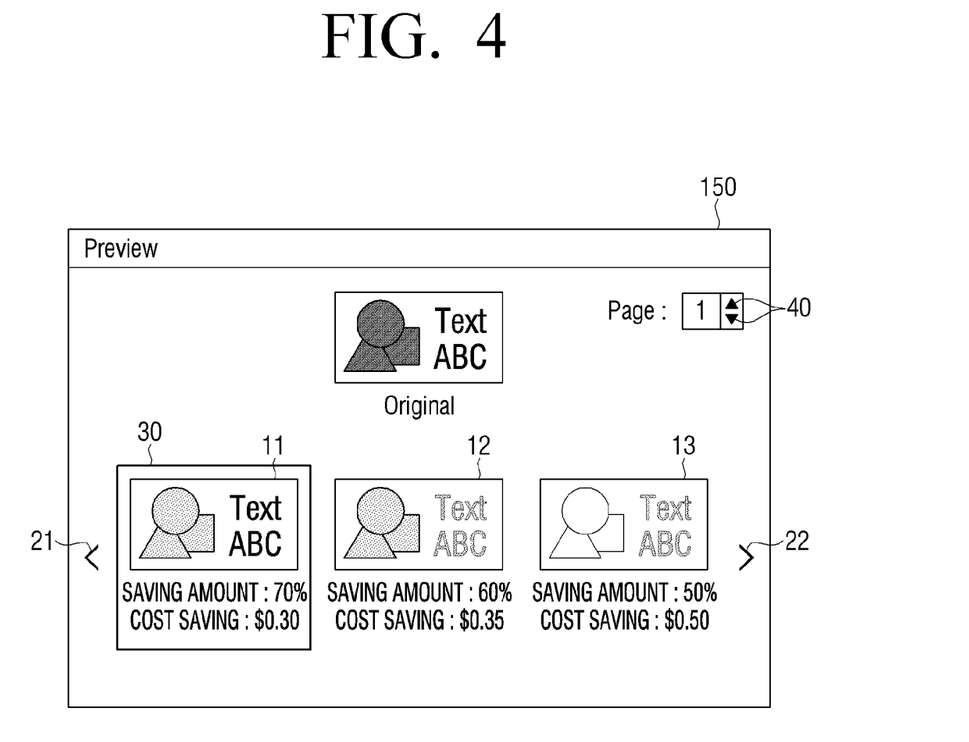

FIG. 4 illustrates a screen that is displayed on the display 150 according to an exemplary embodiment.

Referring to FIG. 4, the display 150 may display a plurality of preview images and calculated toner amount to which each of a plurality of saving modes is applied.

The display 150 may display a plurality of preview images 11, 12, 13 to which each of a plurality of print saving mode is applied. The display 150 may display saving level in a unit of percentage along with preview images as illustrated in FIG. 4. Actual cost saving level may be displayed for example, in a unit of currency. Displaying in a unit of currency, when price information is stored in a CRUM, may be realized by obtaining price information from the CRUM, and if price information is not automatically obtained, displaying in a unit of currency may be realized, for example, by inputting price information by a user.

In preparation for a case where a plurality of preview images are not displayed on one screen of the display 150, objects 21 and 22 to receive a command to display a previous or next image may be displayed on the display 150.

Based on information displayed on the display 150, a user may select a preview image through the manipulation inputter 120, or select objects 21 and 22 to display a previous or a next image.

The controller 130, when one of a plurality of preview images is selected, may determine a print saving mode that corresponds to the selected preview image 30 as a print saving mode to be applied to a document.

A user may confirm a plurality of preview images by pages of a document. For example, as illustrated in FIG. 4, when a page conversion object 40 is selected, a plurality of preview images on a previous or a next page may be displayed on the display 150. That is, a user may differently select print saving modes by pages.

According to an exemplary embodiment, the controller 130, based on calculated toner amount for each of a plurality of print saving modes, may control the display 150 to display a preview image only with respect to the print saving modes in which calculated toner amount is not more than a preset toner amount. In other words, from among a plurality of print saving modes, only a preview image of print saving modes with which print may be performed with toner amount that is not more than preset toner amount may be filtered and provided to a user.

To display a more accurate preview image on the display 150, soft-proofing technology to predict print output color may be used. When a print command is input and a spool file is generated, the spool file may be parsed, and red, green, and blue (RGB) data may be obtained. The obtained RGB data may be converted to cyan-magenta-yellow-black (CMYK) data using RGB->CMYK look-up table (LUT) and interpolation. The converted CMYK data may be converted to Soft-Proven R'G'B' data using CMYK->RGB LUT and interpolation. A preview screen may be generated using the converted Soft-Proven R'G'B' data.

The printer driver 140 generates print data with respect to a print job. The printer driver 140 may generate print data with respect to a document according to a print saving mode that is determined by the controller 130.

According to an exemplary embodiment, the printer driver 140 may not generate print data by applying the determined print saving mode, but only perform generation of print data corresponding to a print command. The controller 130 may transmit to the image forming apparatus 200 information on the print saving mode that is determined through the communication interface 110, and application of a substantial print saving mode may be performed by the image forming apparatus 200.

Using the print control apparatus 100 according to the various exemplary embodiments, toner may be saved without separate user manipulation. In addition, printing may be performed according to an optimized print saving mode from among a plurality of print saving modes.

FIG. 2 illustrates the controller 130 and the printer driver 140 as separate configurations. However, each configuration may be combined to each other. For example, the controller 130 and the printer driver 140 may be one configuration.

An exemplary operation to generate print data by applying a print saving mode may be performed by the image forming apparatus, and the image forming apparatus 200 is explained with reference to FIG. 5.

Figure 5:
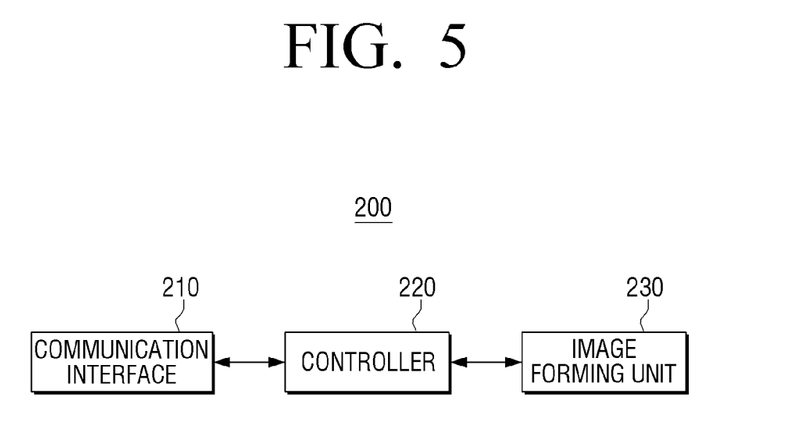
FIG. 5 is a block diagram illustrating a configuration of an image forming apparatus according to an exemplary embodiment.

FIG. 5 is a block diagram illustrating a configuration of an image forming apparatus according to an exemplary embodiment.

Referring to FIG. 5, the image forming apparatus 200 includes the communication interface 210, the controller 220, and the image forming unit 230.

The communication interface 210 may be formed to connect the image forming apparatus 200 with an external apparatus, and may be formed to the print control apparatus 100 through a local area network (LAN) and an internet network or through a universal serial bus (USB).

The communication interface 210 may receive print data. The communication interface 210 may transmit status information of the image forming apparatus to the print control apparatus 100. The status information may include information on whether the image forming apparatus 200 is operable and toner information (e.g., information on amount of toner (when the image forming apparatus has a plurality of toners, information on toner amount of each toner)). The status information may include information on toner price. According to an exemplary embodiment, print data is received from the print control apparatus 100, but when the image forming apparatus 200 enables direct printing, the communication interface 210 may receive a file as print data. The direct printing indicates technology to perform printing with only an operation to transmit a file to the image forming apparatus.

The controller 220 controls each configuration in the image forming apparatus 200. The controller 220 may calculate toner amount of each of a plurality of print saving modes applicable to print data received through the communication interface 210.

Which print saving mode is to be applied for a print data from among print saving modes may be determined from among object attributes included in a print data to be printed. For example, when a graphic or an image object is included in a print data, a print saving mode that is set so that only a boundary of an image or a graphic is printed is applicable. According to an exemplary embodiment, when objects of graphics or images and texts are included in a print data, a print saving mode is applicable in which concentration of objects of graphics or images may be reduced, but original concentration may be maintained for texts.

In other words, the controller 220 may analyze object attributes included in print data, apply print saving modes that are applicable from among a plurality of print saving mode, and calculate toner amount.

The plurality of print saving modes may include when concentration of an image in an original document is 100%, a mode that is set to reduce concentration of an image in a document to a preset percent, a mode in which toner saving levels are differently set by objects included in a document, a mode in which toner saving is not set for texts in a document but toner saving is set for images or graphics in a document, a mode that is set so that boundary of images or graphics in a document is printed, a mode in which color objects in a document are printed in black and white, a mode in which both sides of a document are printed, a mode in which all documents are printed, and a mode in which all the texts are printed in black, or the like. The above are merely examples of a print saving mode, and other modes that may save toner are available.

The controller 220 may combine a plurality of print saving modes, apply the modes to print data, and calculate toner amount. For example, the controller 220 may calculate toner amount by applying the first print saving mode, the second print saving mode, and the third print saving mode in an overlapped manner.

The controller 220 may reduce a document to ¼ and ¹⁄₁₆ and calculate toner amount. In case of reducing a document and calculating toner amount, calculation speed may be increased.

The controller 220 may determine a print saving mode to be applied to a print data based on calculated toner amount. For example, the controller 220 may determine a print saving mode in which calculated toner amount is least, as a print saving mode to be applied to a document.

The controller 220, by comparing toner amount calculated for each of a plurality of print saving modes with a preset toner amount, may determine a print saving mode in which difference between a preset toner amount and calculated toner amount is least as a print saving mode to be applied to a document. The preset toner amount may be adjusted by a user.

For example, when a preset toner amount is 50, if toner amount for the first print saving mode is 40, toner amount for the second print saving mode is 45, and toner amount for the third print saving mode is 52, the controller 220 may determine the third print saving mode in which a difference between the preset toner amount and the calculated toner amount is least as a print saving mode to be applied to a document.

According to an exemplary embodiment, the controller 220 may determine a print saving mode in which a difference between a preset toner amount and a calculated amount is least but at the same time the difference is less than a preset toner amount as a print saving mode to be applied for a document. According to an exemplary embodiment, the controller 220 may determine the second print saving mode of which toner amount is 45 as a print saving mode to be applied for a document.

According to an exemplary embodiment, a print saving mode to be applied for print data at the image forming apparatus 200 may not be determined, and information on a print saving mode to be applied to print data may be received from the print control apparatus 100.

The image forming unit 230 prints print data. The image forming unit 230 may print received print data from the communication interface 210 using a print saving mode determined by the controller 130.

According to an exemplary embodiment, the image forming unit 230, based on information on a print saving mode received from the print control apparatus 100, may apply a print saving mode to print data and print the data.

The image forming apparatus 200 may apply the print saving mode to not only the print data received from an external apparatus but also an image data scanned from a scanner of the image forming apparatus 200.

Although not illustrated in FIG. 5, the image forming apparatus 200 may include a manipulation inputter and/or a display. Operations of the manipulation inputter of the image forming apparatus 200 and the display may be overlapped with the operations of the manipulation inputter 120 and the display 150 of the print control apparatus 100 described in FIGS. 2-4.

According to various exemplary embodiments, using the image forming apparatus 200, toner amount may be saved while printing. In a large business environment, for example, where a plurality of print control apparatuses may be connected to one image forming apparatus, setting the image forming apparatus to automatically apply a print saving mode, as described according to an exemplary embodiment, may result in saving of toner.

Figure 6:
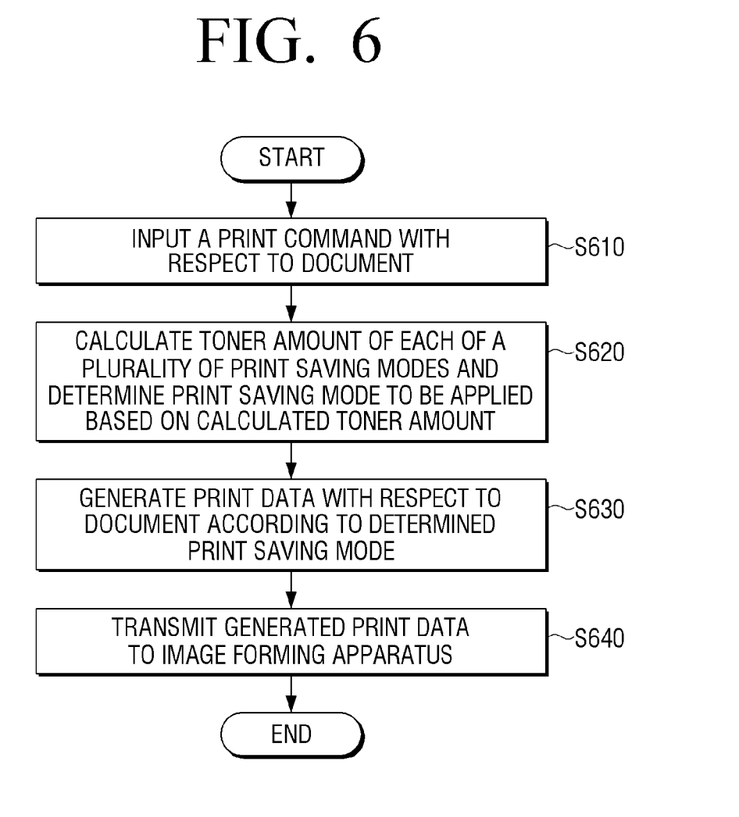
FIG. 6 illustrates a print control method according to an exemplary embodiment, and, FIG. 7 illustrates an image forming method according to an exemplary embodiment.

FIG. 6 illustrates a print control method according to an exemplary embodiment.

Referring to FIG. 6, a print command is received (S610).

Toner amount of each of a plurality of print saving modes applicable to a document is calculated, and a print saving mode to be applied based on the calculated toner amount is determined (S620). Toner amount that is required to print various objects (such as texts, images, and graphics) may be calculated. Toner amount may be calculated by applying each of print saving modes applicable to a document. By comparing the calculated toner amount with preset criterion, a print saving mode that has toner amount suitable for the criterion may be determined as a print saving mode applicable to a document.

According to the determined print saving mode, print data with respect to a document is generated (S630).

The generated print data is transmitted to the image forming apparatus (S640).

Accordingly, a print control method according to the exemplary embodiment may save toner while printing, without a separate user manipulation. Print may be performed according to a print saving mode that is optimized from among a plurality of print saving modes. The print control method as illustrated in FIG. 6 may be executed on the print control apparatus 100 having the configuration of FIG. 2, and may also be executed on a print control apparatus having other configurations.

The print control method may be stored in a non-transitory readable medium. The non-transitory readable medium may be stored on various apparatuses and used.

The non-transitory recordable medium refers to a medium that may store data semi-permanently rather than storing data for a short time such as a register, a cache, and a memory and may be readable by an apparatus. An exemplary application or program may be stored in a non-transitory recordable medium such as compact disc (CD), digital video disk (DVD), hard disk, Blu-ray disk, USB, memory card, and read-only memory (ROM) and provided therein.

Accordingly, the program may be installed in a print control apparatus, and print data to which a print saving mode is applied may be generated.

Figure 7:
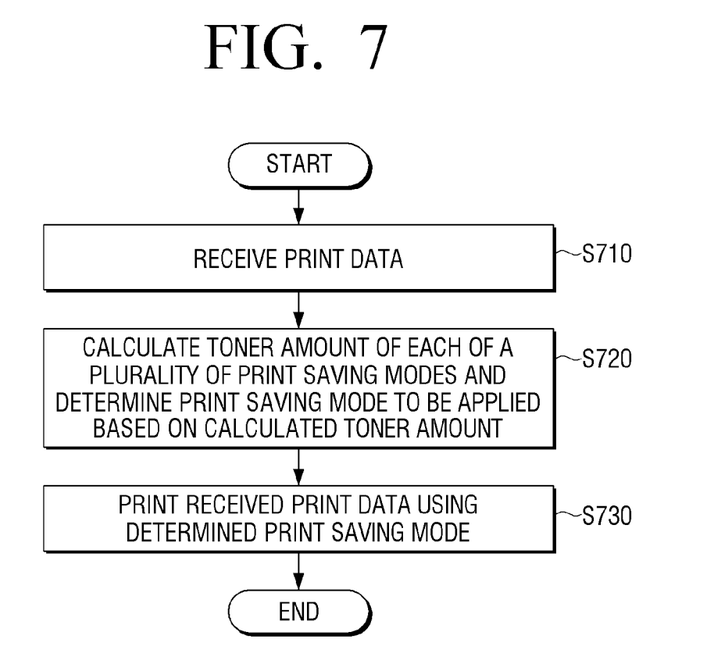

FIG. 7 illustrates an image forming method according to an exemplary embodiment.

Referring to FIG. 7, print data is received (S710). For example, print data may be received from an external apparatus and/or an image data scanned from a scanner of the image forming apparatus may be used.

Toner amount of each of a plurality of print saving modes applicable to print data may be calculated, and a print saving mode to be applied to print data may be determined based on the calculated toner amount (S720). Toner amount required to print various objects (for example, texts, images, graphics) in print data (or scanned image data) may be calculated. By applying each of the print saving mode applicable to documents, toner amount may be calculated. By comparing the calculated toner amount with preset criterion, a print saving mode that has toner amount that is suitable for the criterion may be determined as a print saving mode to be applied to a document.

The received print data may be printed by using the determined print saving mode (S730).

According to the various exemplary embodiments, using the image forming apparatus, toner amount may be saved while printing. In a large company environment where a plurality of print control apparatuses may be connected to one image forming apparatus, setting the image forming apparatus to automatically apply a print saving mode, exemplary embodiment may result in the effect to force users to save toner. The image forming method as illustrated in FIG. 7 may be executed on an image forming apparatus 200 having the configuration of FIG. 5, and may be executed at the image forming apparatus having other configurations.

An exemplary image forming method may be stored in a non-transitory readable medium. The non-transitory readable medium may be stored on various apparatuses and used.

The non-transitory recordable medium refers to a medium that may store data semi-permanently rather than storing data for a short time such as a register, a cache, and a memory and may be readable by an apparatus. An exemplary application or program may be stored in a nontemporal recordable medium such as compact disc (CD), digital video disk (DVD), hard disk, Blu-ray disk, USB, memory card, and read-only memory (ROM) and provided therein.

Accordingly, the above-described program may be installed in the related-art image forming apparatus, and print data to which a print saving mode is applied may be generated.

Although a few embodiments have been shown and described, it would be appreciated by those skilled in the art that changes may be made in these embodiments without departing from the principles and spirit and the scope that is defined in the claims and their equivalents.

What is claimed is:

1. A print control apparatus connectable to an image forming apparatus, the print control apparatus comprising:
    a manipulation inputter configured to receive a command to print a document including at least one object;
    a controller configured to determine a plurality of print saving modes that are applicable to the document based on an attribute of the at least one object of the document, calculate a toner amount for each of the plurality of print saving modes, compare the calculated toner amount for each of the plurality of print saving modes with a preset toner amount, select a print saving mode in which a difference between the preset toner amount and the calculated toner amount is at a minimum amount from among the plurality of print saving modes, and determine the selected print saving mode as a print saving mode to be applied to the document;
    a printer driver configured to generate print data on the document according to the determined print saving mode; and
    a communication interface configured to transmit the generated print data to the image forming apparatus.

2. The print control apparatus of claim 1, wherein the plurality of print saving modes comprise a first print saving mode in which toner saving levels are differently set for objects included in the document.

3. The print control apparatus of claim 1, wherein the plurality of print saving modes comprise a second print saving mode in which toner saving is not set for texts in the document, but toner saving is set for images or graphics in the documents.

4. The print control apparatus of claim 1, wherein the plurality of print saving modes comprise a third print saving mode in which only boundary of images or graphics is printed.

5. The print control apparatus of claim 1, wherein the manipulation inputter receives selection of a page to which the print saving mode is applied, and
    wherein the controller calculates the toner amount by applying each of the plurality of print saving modes to the selected page through the manipulation inputter.

6. The print control apparatus of claim 1, further comprising:
    a display that displays a plurality of preview images to which each of a plurality of print saving modes is applied and calculated toner amount,
    wherein the controller, in response to one of the plurality of preview images being selected, determines a print saving mode that corresponds to the selected preview image as a print saving mode to be applied to the document.

7. The print control apparatus of claim 6, wherein the controller controls the display to display a preview image to which a print saving mode where the calculated toner amount from among the plurality of print saving modes is not more than a preset toner amount is applied.

8. A print control apparatus connectable to an image forming apparatus, the print control apparatus comprising:
    a manipulation inputter configured to receive a command to print a document including at least one object;
    a controller configured to determine a plurality of print saving modes that are applicable to the document based on an attribute of the at least one object of the document, calculate a toner amount for each of the plurality of print saving modes, compare the calculated toner amount for each of the plurality of print saving modes with a preset toner amount, select a print saving mode in which a difference between the preset toner amount and the calculated toner amount is at a minimum amount from among the plurality of print saving modes, and determine the selected print saving mode as a print saving mode to be applied to the document;
    a printer driver configured to generate print data on the document; and
    a communication interface configured to transmit the generated print data and information on the determined print saving mode to the image forming apparatus.

9. An image forming apparatus, comprising:
    a communication interface configured to receive print data including at least one object;
    a controller to determine a plurality of print saving modes that are applicable to the print data based on an attribute of the at least one object of the print data, calculate a toner amount for each of the plurality of print saving modes, compare the calculated toner amount for each of the plurality of print saving modes with a preset toner amount, select a print saving mode in which a difference between the preset toner amount and the calculated toner amount is at a minimum amount from among the plurality of print saving modes, and determine the selected print saving mode as a print saving mode to be applied to the print data; and
    an image forming unit to print the received print data using the determined print saving mode.

10. A print control method, the method comprising:
    receiving a command to print a document including at least one object;
    determining a plurality of print saving modes that are applicable to the document based on an attribute of the at least one object of the document;
    calculating a toner amount for each of the plurality of print saving modes;
    comparing the calculated toner amount for each of the plurality of print saving modes with a preset toner amount;
    selecting a print saving mode in which a difference between the preset toner amount and the calculated toner amount is at a minimum amount from among the plurality of print saving modes;
    determining the selected print saving mode as a print saving mode to be applied to the document;
    generating print data on the document according to the determined print saving mode; and
    transmitting the generated print data to an image forming apparatus.

11. The print control method of claim 10, wherein the plurality of print saving modes comprise a first saving mode in which toner saving levels are differently set for objects included in the document.

12. The print control method of claim 10, wherein the plurality of print saving modes comprise a second print saving mode in which toner saving is not set for texts in the document, but toner saving is set for images or graphics in the documents.

13. The print control method of claim 10, wherein the plurality of print saving modes comprise a third print saving mode in which only boundary of images or graphics is printed.

14. The print control method of claim 10, the method further comprising:
  receiving selection of a page to which the print saving mode is applied,
  wherein the calculating comprises calculating a toner amount by applying each of the plurality of print saving modes to the selected page.

15. The print control method of claim 10, the method further comprising:
  displaying a plurality of preview images to which each of the plurality of print saving modes is applied and a calculated toner amount; and
  determining a print saving mode that corresponds to the selected preview image as a print saving mode to be applied to the document, when one of the plurality of preview images is selected.

16. A print control method, comprising:
  receiving a command to print a document including at least one object;
  determining a plurality of print saving modes that are applicable to the document based on an attribute of the at least one object of the document;
  calculating a toner amount for each of the plurality of print saving modes;
  comparing the calculated toner amount for each of the plurality of print saving modes with a preset toner amount;
  selecting a print saving mode in which a difference between the preset toner amount and the calculated toner amount is at a minimum amount from among the plurality of print saving modes;
  determining the selected print saving mode as a print saving mode to be applied to the document;
  generating print data on the document; and
  transmitting the generated print data and information on the determined print saving mode to an image forming apparatus.

17. An image forming method, comprising:
  receiving print data including at least one object;
  determining a plurality of print saving modes that are applicable to the print data based on an attribute of the at least one object of the print data;
  calculating a toner amount for each of a plurality of print saving modes applicable to the document;
  comparing the calculated toner amount for each of the plurality of print saving modes with a preset toner amount;
  selecting a print saving mode in which a difference between the preset toner amount and the calculated toner amount is at a minimum amount from among the plurality of print saving modes:
  determining the selected print saving mode to be applied to the print data; and
  printing the received print data using the determined print saving mode.

18. A non-transitory computer-readable medium including a program to execute a print control method, wherein the print control method comprises:
  receiving a command to print a document including at least one object;
  determining a plurality of print saving modes that are applicable to the document based on an attribute of the at least one object of the document;
  calculating a toner amount for each of the plurality of print saving modes;
  comparing the calculated toner amount for each of the plurality of print saving modes with a preset toner amount;
  selecting a print saving mode in which a difference between the preset toner amount and the calculated toner amount is at a minimum amount from among the plurality of print saving modes;
  determining the selected print saving mode as a print saving mode to be applied to the; document;
  generating print data on the document according to the determined print saving mode; and
  transmitting the generated print data to an image forming apparatus.

* * * * *